G. W. JORDAN.
Adjustable Attachments to Reversing Levers, &c
No. 137,374.                Patented April 1, 1873.
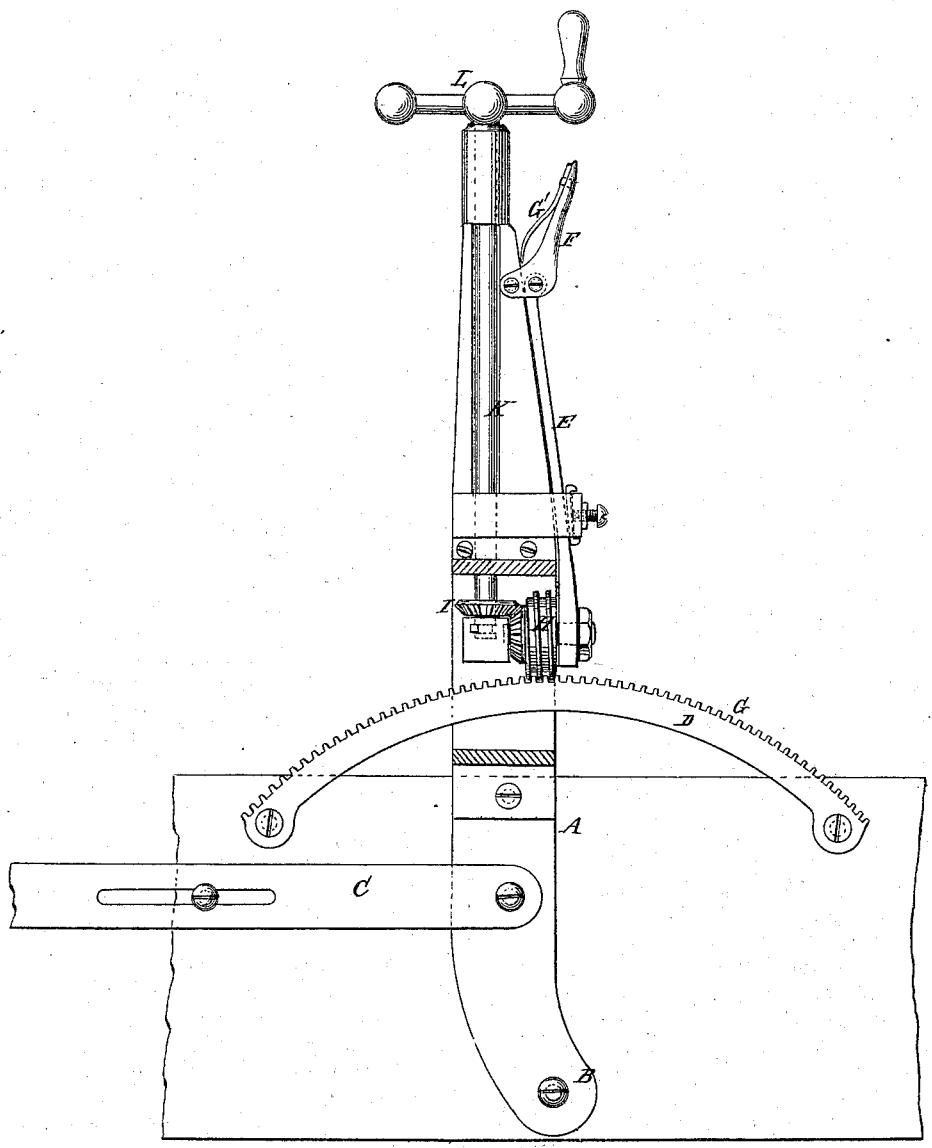
Witnesses:
Inventor:

UNITED STATES PATENT OFFICE.

GEORGE W. JORDAN, OF PASSAIC, NEW JERSEY.

IMPROVEMENT IN ADJUSTING ATTACHMENTS TO REVERSING-LEVERS, &c.

Specification forming part of Letters Patent No. 137,374, dated April 1, 1873; application filed January 18, 1873.

*To all whom it may concern:*

Be it known that I, GEORGE W. JORDAN, of Passaic, in the county of Passaic and State of New Jersey, have invented a new and useful Improvement in Adjusting Attachment to Reversing and other Levers, of which the following is a specification:

My invention consists of a worm-wheel and turning-gear to work it; also, a toothed face on the quadrant-bar for holding the lever of a reversing apparatus, throttle-valve, and the like levers, so combined with the lever and the said holding-bar that the lever can be shifted by the worm when it is desired to adjust it nicely, while at the same time the worm-wheel, which also serves for the holding-catch, can be disengaged by the ordinary catch-lever, in the same manner that the ordinary catch is, when the principal lever is to be shifted to any considerable extent.

The drawing is a side elevation of a reversing-lever or valve-actuating apparatus with my improvements applied to it.

A represents the lever, which may be for reversing the link-motion of an engine, working the throttle-valve, and the like, the said lever being pivoted to a support, B, and connecting, by a rod, C, with the thing to be moved. D is the ordinary curved catch-bar used with such levers for receiving the sliding catch on the upper part of the lever in notches in its convex face, the said catch being a part of the sliding bar E, which is raised by the small lever F and forced down by the spring G. Now, I propose to construct a thread, G, suitable for a worm-wheel or nut, on this bar D, and, in place of the usual catch, fit a worm-wheel, H, on the lever and in connection with the sliding bar E, so that it can be put in gear with the latch G or withdrawn from it by said lever; also so that, by being turned while in gear, it will move the lever A forward or back, according to the way in which it may be turned, and so move the lever positively and to any required nicety or exactitude, which cannot well be attained by shifting the lever by hand. For turning this worm-wheel, I provide a bevel-gear wheel, I, on the end of a shaft, K, ranging alongside of the lever and extending to the upper end, where it is provided with a hand-crank, L, for turning it. The wheel I gears with a corresponding wheel on the end of the worm-wheel.

Having thus described my invention, I claim as new and desire to secure by Letters Patent—

The combination, with the lever A, sliding bar E, and the curved holding-bar D, of a worm-wheel and a toothed face on the bar D, the said worm-wheel having devices for turning it arranged relatively to the lever A, substantially as specified.

GEORGE W. JORDAN.

Witnesses:
RICHARD PEACOCK,
GILBERT SPENCER.